(12) United States Patent
Onogi et al.

(10) Patent No.: US 12,708,866 B2
(45) Date of Patent: Aug. 18, 2026

(54) FLUIDIC DEVICE AND METHOD FOR CONTROLLING FLUIDIC DEVICE

(71) Applicant: SEIKO EPSON CORPORATION, Tokyo (JP)

(72) Inventors: Tomohide Onogi, Shiojiri (JP); Chikara Kojima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 546 days.

(21) Appl. No.: 18/157,244

(22) Filed: Jan. 20, 2023

(65) Prior Publication Data

US 2023/0226466 A1 Jul. 20, 2023

(30) Foreign Application Priority Data

Jan. 20, 2022 (JP) ................................ 2022-006961

(51) Int. Cl.

| | |
|---|---|
| ***G01F 1/667*** | (2022.01) |
| ***B01D 21/28*** | (2006.01) |
| ***B01D 21/34*** | (2006.01) |
| ***C02F 1/00*** | (2023.01) |
| ***C02F 1/36*** | (2023.01) |
| ***G01F 23/2962*** | (2022.01) |

(52) U.S. Cl.
CPC .......... *B01D 21/283* (2013.01); *B01D 21/34* (2013.01); *C02F 1/008* (2013.01); *C02F 1/36* (2013.01)

(58) Field of Classification Search
CPC ................. B01D 21/283; B01D 21/34; B01L 2200/0652; B01L 2400/0439; B01L 3/50273; B01L 3/502761; C02F 1/008; C02F 1/36; C02F 2103/002
See application file for complete search history.

(56) References Cited

U.S. PATENT DOCUMENTS 9,096,823 B1 * 8/2015 Branch ................ B01L 3/5027
2021/0123038 A1 * 4/2021 Musiak ................. C12M 47/02

FOREIGN PATENT DOCUMENTS

JP 2021507561 A 2/2021
WO 2019118921 A 6/2019

OTHER PUBLICATIONS

Enhancement in acoustic focusing of micro and nanoparticles by thinning a microfluidic device.
Office Action for JP Patent Application No. 2022006961, issued on Oct. 7, 2025, 6 pages.

* cited by examiner

*Primary Examiner* — Dirk R Bass
(74) *Attorney, Agent, or Firm* — CHIP LAW GROUP

(57) ABSTRACT

A fluidic device includes: a channel that extends along a first axis and through which a fluid flows; an ultrasonic transmission part that is disposed at the channel and transmits an ultrasonic wave into the channel along a second axis orthogonal to the first axis in response to an input of a drive signal; and a controller that controls the ultrasonic transmission part. The controller measures impedance of the ultrasonic transmission part at a time when the ultrasonic transmission part is driven while changing a drive frequency of the drive signal within a predetermined range, specifies a drive frequency at which the impedance is a local maximum and sets the drive frequency at which the impedance is a local maximum as a first drive frequency, and inputs the drive signal of the first drive frequency to the ultrasonic transmission part.

8 Claims, 6 Drawing Sheets

FIG. 1

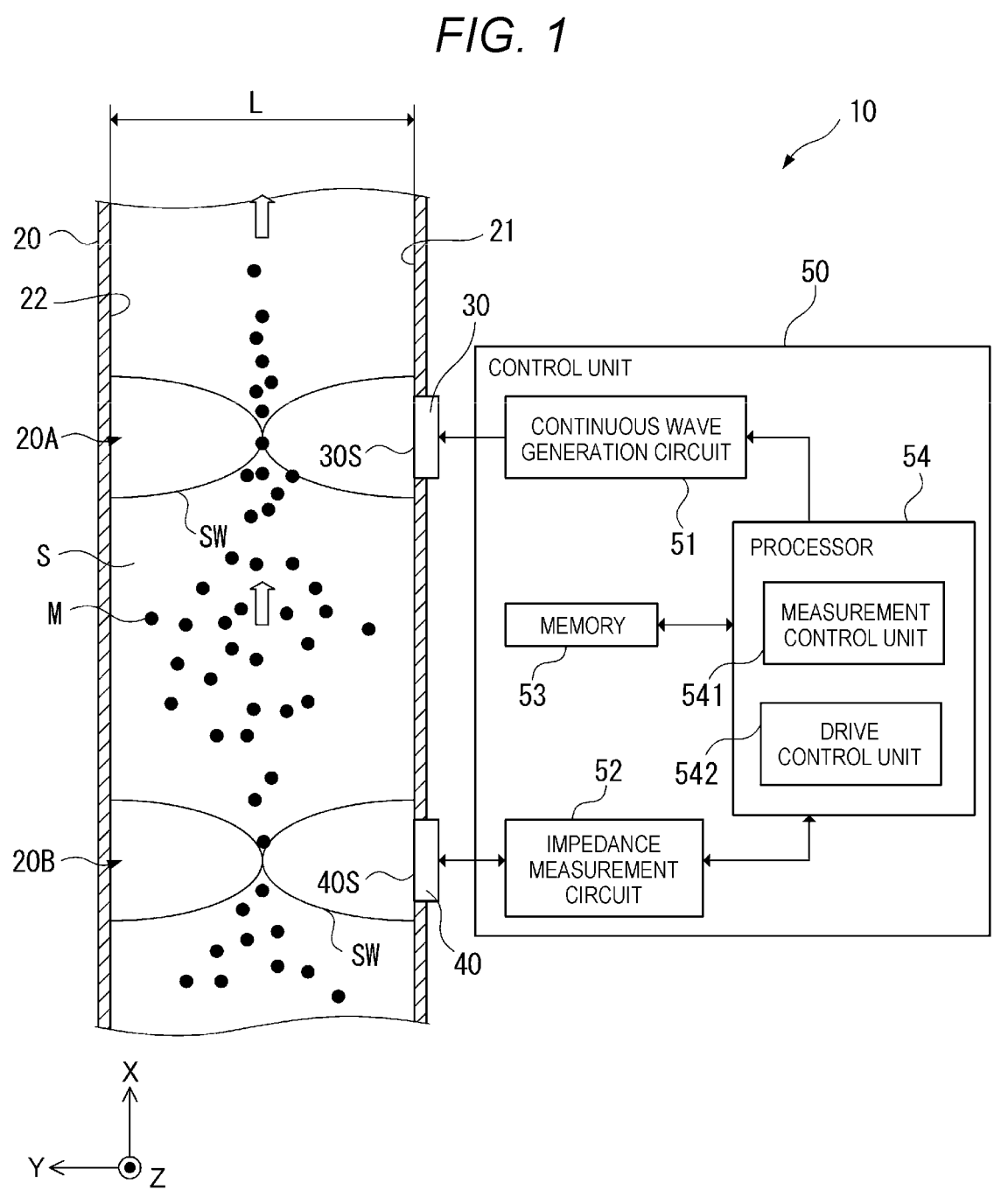

L
10
20
21
22
50
30
CONTROL UNIT
CONTINUOUS WAVE GENERATION CIRCUIT
20A
30S
54
SW
51
PROCESSOR
S
M
MEASUREMENT CONTROL UNIT
MEMORY
53
541
DRIVE CONTROL UNIT
52
542
20B
IMPEDANCE MEASUREMENT CIRCUIT
40S
SW
40
X
Y
Z

START
2
DRIVE MODE COUPLING
S11
OUTPUT DRIVE COMMAND OF FIRST DRIVE FREQUENCY Fd
S12
1
TRANSMIT CONTINUOUS WAVE
S13
S14
NO
MEASUREMENT TIMING?
YES
1
MEASUREMENT MODE COUPLING
S15
MEASURE IMPEDANCE
S16
SPECIFY DRIVE FREQUENCY AT LOCAL MAXIMUM (SECOND DRIVE FREQUENCY Fs)
S17
Fs=Fd?
NO
S6
YES
S7
UPDATE FIRST DRIVE FREQUENCY Fd
YES
CONTINUE?
S8
NO
2
END
2

FLUIDIC DEVICE AND METHOD FOR CONTROLLING FLUIDIC DEVICE

The present application is based on, and claims priority from JP Application Serial Number 2022-006961, filed Jan. 20, 2022, the disclosure of which is hereby incorporated by reference herein in its entirety.

BACKGROUND

1. Technical Field

The present disclosure relates to a fluidic device and a method for controlling a fluidic device.

2. Related Art

In the related art, a fluidic device that performs acoustic focusing of fine particles in a fluid has been known. For example, a fluidic device disclosed in "Enhancement in acoustic focusing of micro and nanoparticles by thinning a microfluidic device" (Nobutoshi Ota and 6 others, December 2019, Royal Society Open Science, Volume 6, Issue 2, Article No. 181776) (Non-Patent Literature 1) includes a channel substrate (glass substrate) in which a channel is formed, and a piezoelectric element provided at the channel substrate. An ultrasonic wave generated by the piezoelectric element is transmitted into the channel via the channel substrate, and a standing wave is generated in a fluid in the channel. Fine particles in the fluid are captured in a predetermined range in the channel due to a pressure gradient of the fluid formed by the standing wave.

The fluidic device disclosed in Non-Patent Literature 1 causes the fine particles to converge in the fluid by the standing wave generated based on the ultrasonic wave, but it is difficult to stably generate the standing wave because a generation condition of the standing wave changes due to disturbance such as a temperature change.

SUMMARY

A fluidic device according to a first aspect of the present disclosure includes: a channel that extends along a first axis and through which a fluid flows; an ultrasonic transmission part that is disposed at the channel and transmits an ultrasonic wave into the channel along a second axis orthogonal to the first axis in response to an input of a drive signal; and a controller that controls the ultrasonic transmission part. The controller measures impedance of the ultrasonic transmission part at a time when the ultrasonic transmission part is driven while changing a drive frequency of the drive signal within a predetermined range, specifies a drive frequency at which the impedance is a local maximum and sets the drive frequency as a first drive frequency, and inputs the drive signal of the first drive frequency to the ultrasonic transmission part.

A method for controlling a fluidic device according to the first aspect of the present disclosure is a method for controlling a fluidic device that captures a fine particle in a fluid flowing through a channel extending along a first axis, the fluidic device including an ultrasonic transmission part that is disposed at the channel and transmits an ultrasonic wave into the channel along a second axis orthogonal to the first axis in response to input of a drive signal. The method for controlling a fluidic device includes: measuring impedance of the ultrasonic transmission part at a time when the ultrasonic transmission part is driven while changing a drive frequency of the drive signal within a predetermined range; specifying a drive frequency at which the impedance is a local maximum and setting the drive frequency as a first drive frequency; and inputting the drive signal of the first drive frequency to the ultrasonic transmission part.

BRIEF DESCRIPTION OF THE DRAWINGS

FIG. 1 is a diagram schematically illustrating a fluidic device according to a first embodiment.

DESCRIPTION OF EXEMPLARY EMBODIMENTS

First Embodiment

Figure 2:
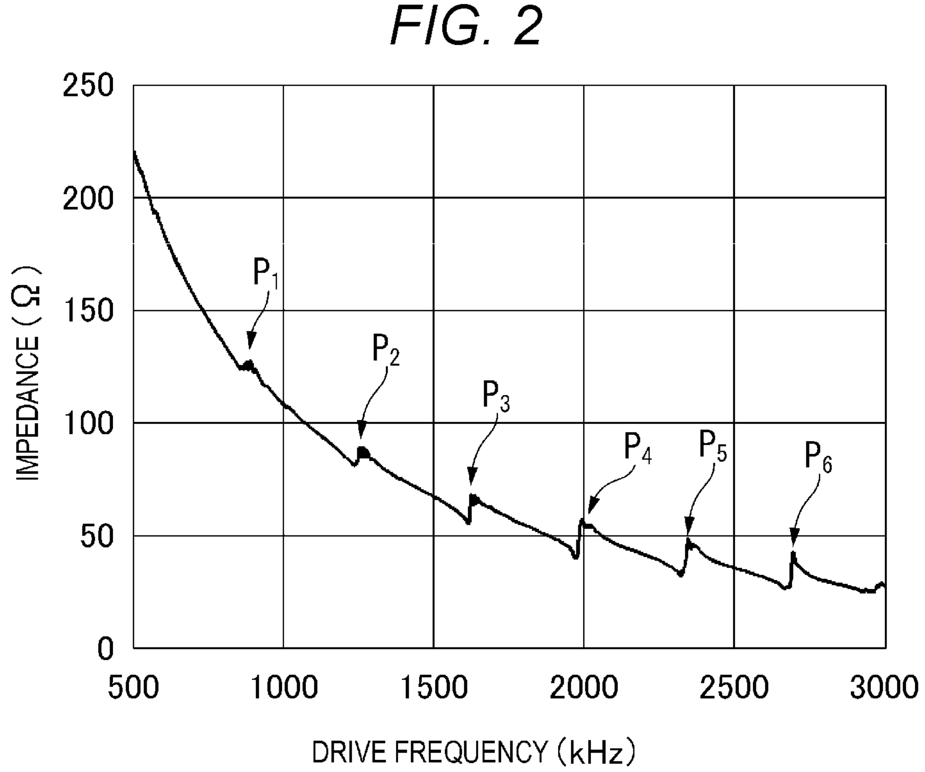
FIG. 2 is a graph illustrating a change in impedance of a second ultrasonic element in a case where a drive frequency of a second drive signal is changed in the first embodiment.

Hereinafter, a fluidic device according to a first embodiment will be described.

Configuration of Fluidic Device

FIG. 1 is a cross-sectional view schematically illustrating a fluidic device 10 according to the first embodiment.

The fluidic device 10 includes a channel 20, a first ultrasonic element 30, a second ultrasonic element 40, and a controller 50. The channel 20 extends along an X axis that is a first axis, and allows a fluid S to flow therethrough. The first ultrasonic element 30 generates a standing wave SW transmitting along a Y axis, which is a second axis, in the fluid S in the channel 20. The second ultrasonic element 40 transmits an ultrasonic wave to the fluid S in the channel 20 and receives the ultrasonic wave transmitted through the fluid S. The controller 50 controls driving of the first ultrasonic element 30. Note that the X axis and the Y axis are axes orthogonal to each other, and an axis orthogonal to each of the X axis and the Y axis is taken as a Z axis.

In the fluidic device 10, the standing wave SW of any mode order is formed along a Y-axis direction in a partial region in an X-axis direction in the channel 20. Fine particles M dispersed in the fluid S are affected by a pressure gradient formed due to the standing wave SW in the process of flowing through the channel 20, and converge in a predetermined range centered on a node of the standing wave SW. The fluid S is not particularly limited, and is, for example, water or blood. The fine particles M may be, for example, microfibers or cells.

In such a fluidic device 10, for example, the fine particles M in the fluid S can be concentrated by providing the channel 20 with a concentration channel for selectively flowing the fluid S containing the converged fine particles M and a discharge channel for selectively flowing the rest fluid S.

In FIG. 1, a state of the fine particles M converged in the channel 20 is schematically illustrated. In addition, in FIG. 1, as an example, the standing wave SW of a first-order mode generated in the channel 20 is schematically illustrated, but the mode order of the standing wave SW is not particularly limited.

The channel 20 has a first wall surface 21 and a second wall surface 22 facing each other in the Y-axis direction. A channel width L between the first wall surface 21 and the second wall surface 22 is a known value. A specific configuration of the channel 20 is not particularly limited. For example, the channel 20 is formed of a base substrate formed with a recessed groove and a lid substrate covering the recessed groove, and a glass substrate, a silicon substrate, or the like can be used as each substrate.

In the present embodiment, the channel 20 is formed such that a distance between the first wall surface 21 and the second wall surface 22 of the channel 20, that is, the width along the Y axis (second axis) is the same. At least the width along the Y axis at a first position 20A, where the first ultrasonic element 30 to be described later is provided, and the width along the Y axis at a second position 20B, where the second ultrasonic element 40 is provided, are required to be the same. For example, the width along the Y axis may be increased or reduced between the first position 20A and the second position 20B.

Further, although the first position 20A is positioned downstream of (on a +X side of) the second position 20B in the example illustrated in FIG. 1, the first position 20A may be positioned upstream of the second position 20B.

Although not illustrated, the channel 20 is provided with an injection port for injecting the fluid S into the channel 20 and one or more discharge ports for discharging the fluid S from the channel 20. When the channel 20 is provided with the concentration channel and the discharge channel as described above, a discharge port is provided for each of these channels.

The first ultrasonic element 30 constitutes an ultrasonic transmission part according to the present disclosure. The first ultrasonic element 30 is provided so as to face an inside of the channel 20 at the first position 20A of the channel 20, and generates the standing wave SW transmitting along the Y axis in the fluid S by transmitting an ultrasonic wave of a predetermined frequency to the fluid S. In the present embodiment, an ultrasonic transmission surface 30S of the first ultrasonic element 30 constitutes a part of the first wall surface 21 of the channel 20, and generates the standing wave SW transmitting along the Y-axis direction.

The second ultrasonic element 40 and the first ultrasonic element 30 constitute the ultrasonic transmission part according to the present disclosure. The second ultrasonic element 40 is disposed at the second position 20B different from the first position 20A where the first ultrasonic element 30 of the channel 20 is provided. The second ultrasonic element 40 transmits an ultrasonic wave of any frequency to the fluid S in the channel 20. In the present embodiment, an ultrasonic transmission surface 40S of the second ultrasonic element 40 constitutes a part of the first wall surface 21 of the channel 20.

A specific configuration of the ultrasonic element constituting the first ultrasonic element 30 or the second ultrasonic element 40 is not particularly limited. For example, the ultrasonic element may have a configuration of vibrating a piezoelectric actuator, a configuration of vibrating a vibration plate on which a piezoelectric thin film is formed, or a configuration of vibrating a vibration plate provided in an electrostatic actuator. Such an ultrasonic element generates vibration when a drive signal (voltage) of a predetermined drive frequency is applied thereto, and transmits an ultrasonic wave.

A relative position of the second position 20B, where the second ultrasonic element 40 is provided, with respect to the first position 20A, where the first ultrasonic element 30 is provided, is not particularly limited. However, the second ultrasonic element 40 is preferably spaced apart from the first ultrasonic element 30 to such an extent that the generation of the standing wave SW is not affected for each other. A temperature of the fluid S flowing through the first position 20A and a temperature of the fluid S flowing through the second position 20B are preferably the same. For example, the first position 20A and the second position 20B are within a distance range in which a temperature difference between the temperature at the first position 20A and that at the second position 20B does not occur. In a case where the distance between the first position 20A and the second position 20B is large, it is preferable that a surrounding environment is set such that the temperature of the fluid S is substantially the same at the first position 20A and the second position 20B.

The controller 50 includes a continuous wave generation circuit 51, an impedance measurement circuit 52, a memory 53, and one or more processors 54 that control the first ultrasonic element 30 and the second ultrasonic element 40 via the individual circuits.

The continuous wave generation circuit 51 corresponds to a first drive unit according to the present disclosure, and generates a first drive signal to be output to the first ultrasonic element 30. The continuous wave generation circuit 51 is a circuit configured to change a drive frequency of the first drive signal to be output, and forms a first drive signal, whose drive frequency is set to a predetermined first drive frequency Fd, based on the control of the processor 54, and continuously outputs the first drive signal to the first ultrasonic element 30.

The impedance measurement circuit 52 corresponds to a second drive unit according to the present disclosure, and generates a second drive signal to be output to the second ultrasonic element 40. The impedance measurement circuit 52 is a circuit configured to change a drive frequency of the second drive signal to be output, and forms a drive signal of any drive frequency in response to a measurement command from the processor 54 and outputs the drive signal to the second ultrasonic element 40. In addition, the impedance measurement circuit 52 measures impedance of the second ultrasonic element 40. For example, the impedance measurement circuit 52 includes an ammeter that measures a value of a current flowing through the second ultrasonic element 40. The impedance of the second ultrasonic element 40 is measured based on a voltage value of the second drive signal applied to the second ultrasonic element 40 and the current value measured by the ammeter.

The memory 53 is a storage device that stores various programs and various types of data. For example, a value of the first drive frequency Fd of the current first drive signal of the first ultrasonic element 30 is stored in the memory 53.

By executing a program stored in the memory 53, the processor 54 functions as a measurement controller 541 that outputs a measurement command to the impedance measurement circuit 52 and a drive controller 542 that controls the first drive frequency Fd of the first ultrasonic element 30.

Control Mechanism of Fluidic Device

Next, a mechanism and a method for capturing the fine particles M at a node of the standing wave SW at the first position 20A of the channel 20 in the fluidic device 10 of the present embodiment will be described.

When a frequency of the ultrasonic wave transmitted to the fluid is set as f, an order of the standing wave formed by the ultrasonic wave is set as m, a sound velocity in the fluid is set as c, and the channel width along the Y axis is set as L, in order to form the standing wave SW at the first position 20A, the frequency f of the ultrasonic wave output from the first ultrasonic element 30 needs to satisfy the condition of the following formula (1).

$$f = \frac{mc}{2L} \tag{1}$$

Here, when the temperature of the fluid changes, the sound velocity c in the fluid S changes, and thus the frequency f for forming the standing wave SW also changes.

On the other hand, when the standing wave SW is formed in the channel 20, a sound pressure becomes high at a position of an antinode of the standing wave SW. Therefore, the impedance at the time of driving the first ultrasonic element 30 and the second ultrasonic element 40 also increases.

FIG. 2 is a graph illustrating a change in impedance of the second ultrasonic element 40 in a case where the drive frequency of the second drive signal is changed.

As illustrated in FIG. 2, when the drive frequency of the second drive signal increases, the impedance of the second ultrasonic element 40 gradually decreases, and at predetermined intervals, peak points Pn (n=1, 2, 3 . . . ) that are local maximums of the impedance appear. These peak points Pn are observed when the standing wave SW is formed in the channel 20, and indicate that the position of the antinode where the sound pressure of the standing wave SW is maximum is located on the ultrasonic transmission surface 40S of the second ultrasonic element 40.

That is, even when the sound velocity c changes due to the temperature change of the fluid S, an optimum drive frequency for forming the standing wave SW can be specified by detecting the peak point Pn of the impedance of the second ultrasonic element 40.

In the present embodiment, the channel width L at the second position 20B where the second ultrasonic element 40 is provided is the same as the channel width L at the first position 20A where the first ultrasonic element 30 is provided, and the temperatures of the fluid S at the first position 20A and the second position 20B are also the same. Therefore, the condition of the drive frequency for forming the standing wave SW at the second position 20B coincides with the condition of the drive frequency for forming the standing wave SW at the first position 20A.

Method for Controlling Fluidic Device

Next, a method for controlling the fluidic device 10 according to the present embodiment will be described.

Figure 3:
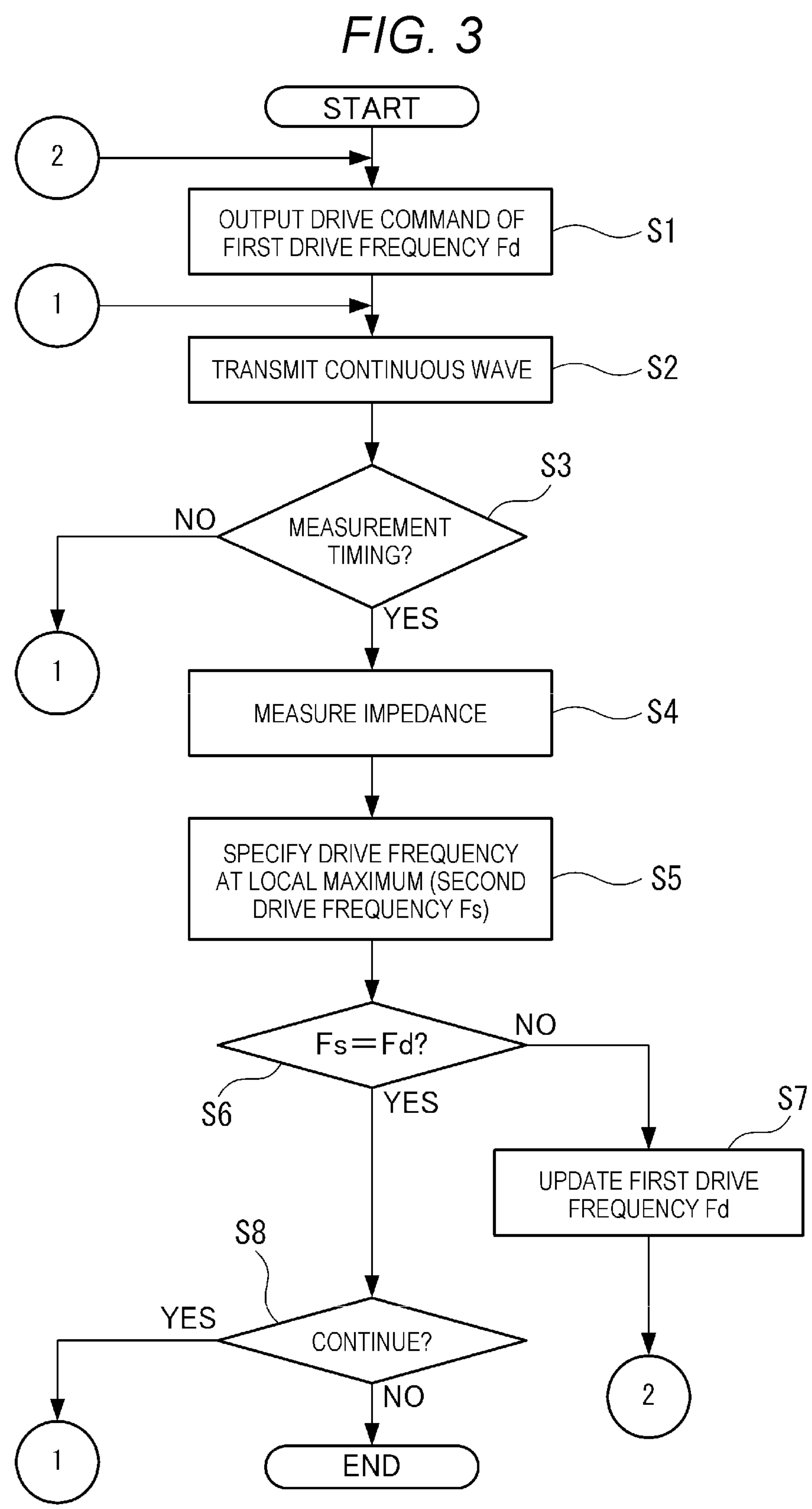
FIG. 3 is a flowchart illustrating a method for controlling the fluidic device according to the first embodiment.

FIG. 3 is a flowchart illustrating the method for controlling the fluidic device 10 according to the present embodiment.

In the present embodiment, the frequency of the ultrasonic wave output from the first ultrasonic element 30 is feedback-controlled based on an impedance measurement result of the second ultrasonic element 40. The measurement of the impedance of the second ultrasonic element 40 may be performed at a constant cycle, and may be performed, for example, when the fluidic device 10 is started.

In the example illustrated in FIG. 3, an example in which the impedance of the second ultrasonic element 40 is measured at a constant cycle is illustrated.

That is, the drive controller 542 of the controller 50 reads the first drive frequency Fd recorded in the memory 53, and outputs, to the continuous wave generation circuit 51, a drive command for driving the first ultrasonic element 30 with the first drive signal of the first drive frequency Fd (step S1).

Accordingly, the continuous wave generation circuit 51 continues to output the first drive signal of the first drive frequency Fd to the first ultrasonic element 30, and a continuous wave based on the first drive frequency Fd is transmitted from the first ultrasonic element 30 to the fluid S (step S2). At this time, when the first drive frequency Fd satisfies an optimum condition for forming the standing wave SW, the fine particles M are captured at the position of the node of the standing wave SW formed at the first position 20A.

When a predetermined measurement timing set in advance is reached (step S3: YES), the measurement controller 541 outputs an impedance measurement command to the impedance measurement circuit 52 to measure a change in impedance of the second ultrasonic element 40 (step S4). If the measurement timing is not reached, the transmission of the continuous wave in step S2 is continued.

When the measurement command is input, the impedance measurement circuit 52 outputs the second drive signal to the second ultrasonic element 40 and changes the drive frequency of the second drive signal within a predetermined range. Then, the impedance measurement circuit 52 measures the change in the impedance of the second ultrasonic element 40 caused due to a change in the drive frequency of the second drive signal.

Figure 4:
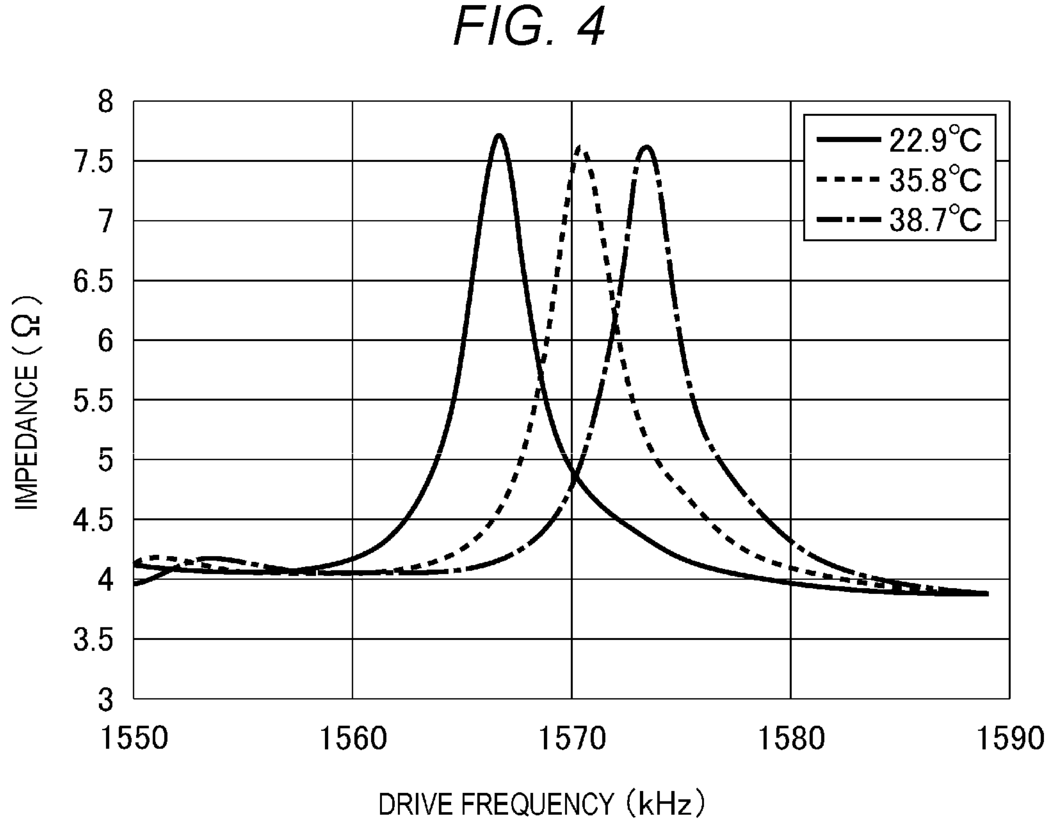
FIG. 4 is a flowchart illustrating a relationship between the drive frequency and the impedance of the second ultrasonic element in a case where a temperature of a fluid is changed in the first embodiment.

Here, the predetermined range is a range corresponding to the order m of the standing wave SW formed in the channel 20. FIG. 4 is a graph illustrating a relationship between the drive frequency and the impedance of the second ultrasonic element 40 in a case where the temperature of the fluid S is changed.

For example, in FIG. 2, when forming the standing wave SW having the order m of 3, the peak point P3 appears in the vicinity of 1570 kHz. When the temperature of the fluid S changes, the drive frequency corresponding to the peak point P3 changes. But a change range of the frequency is a range about ±10 kHz as illustrated in FIG. 4. Therefore, in this case, the drive frequency may be changed in a range of 1560 kHz to 1580 kHz as the predetermined range.

The predetermined range of the drive frequency of the second drive signal can be appropriately set according to an allowable range of the temperature of the fluid S flowing through the channel 20 and the order m of the peak point to be detected. For example, when the allowable range of the temperature of the fluid S flowing through the channel 20 is 20° C. to 40° C. and the order m is 3, as illustrated in FIG. 4, the drive frequency may be changed within a range of ±10 kHz around 1570 kHz. In addition, when the allowable range of the temperature of the fluid S is further widened, the change range of the drive frequency of the second drive signal may be further widened.

When changing the drive frequency of the second drive signal, the impedance measurement circuit 52 may sweep the drive frequency within the predetermined range, for example, or may sequentially change the drive frequency at a predetermined interval (for example, an interval of 1 kHz) set in advance.

Then, based on an impedance measurement result output from the impedance measurement circuit 52, the measurement controller 541 specifies a drive frequency (a second drive frequency Fs) of the second drive signal at a timing when the impedance of the second ultrasonic element 40 is a local maximum (step S5). As described above, when the change range of the drive frequency is minute (a narrow range of about ±10 kHz), the drive frequency at which the impedance is maximum may be specified as the second drive frequency Fs. When the change range of the drive frequency is wider, for example, when the drive frequency changes in a range of 500 kHz to 3000 kHz, a plurality of local maximums (peak points Pn) may be detected from the change of the impedance and the second drive frequency Fs corresponding to a desired order m may be specified from the peak points Pn.

Then, the drive controller 542 determines whether the current first drive frequency Fd coincides with the second drive frequency Fs specified in step S5 (step S6). Here, "coincidence" includes a slight error within a range in which the standing wave SW is formed, in addition to complete coincidence of the first drive frequency Fd and the second drive frequency Fs. That is, in step S6, when |Fd−Fs| is within a preset error range, it is determined that Fd and Fs coincide with each other.

When it is determined to be NO in step S6, the drive controller 542 rewrites and updates the first drive frequency Fd recorded in the memory 53 with the second drive frequency Fs specified in step S5 (step S7), and returns to step S1. That is, in step S1, the first ultrasonic element 30 is driven at the updated first drive frequency Fd. Accordingly, in step S2, the first ultrasonic element 30 is driven at the optimum first drive frequency Fd for forming the standing wave SW.

When it is determined to be YES in step S6, the driving of the first ultrasonic element 30 by the first drive signal at the current first drive frequency Fd is continued. That is, the first drive frequency Fd is not updated, and the driving of the first ultrasonic element 30 in step S2 is continued as it is.

Then, the controller 50 determines whether the formation of the standing wave SW is continued (step S8). For example, when an input indicating that the processing is to be ended is received by a setting input or the like of a user, it is determined to be NO in step S8, and the driving of the fluidic device 10 is stopped. When it is determined to be YES in step S8, the processing is returned to step S2. That is, the driving of the first ultrasonic element 30 in step S2 is continued.

In FIG. 3, the processing of step S8 is performed after it is determined to be YES in step S6, and alternatively, the step S8 may be performed at any timing.

In the example illustrated in FIG. 3, in step S1, the first drive frequency Fd stored in the memory 53 is read to drive the first ultrasonic element 30. That is, immediately after the fluidic device 10 is started, the fluidic device 10 is driven at the first drive frequency Fd measured at the previous operation of the fluidic device 10. Alternatively, before step S1, the processing from step S4 to step S7 may be performed, and the optimum first drive frequency Fd for forming the standing wave SW may be set for the first time.

Operation and Effect of Present Embodiment

The fluidic device 10 according to the present embodiment includes the channel 20, the first ultrasonic element 30 and the second ultrasonic element 40, and the controller 50. The channel 20 extends along the X axis (first axis) and allows the fluid S to flow therethrough. The first ultrasonic element 30 and the second ultrasonic element 40 are disposed at the channel 20, and transmit ultrasonic waves into the channel 20 along the Y axis (second axis) in response to input of a drive signal. The controller 50 measures the impedance of the second ultrasonic element 40 at a time when the second ultrasonic element 40 is driven while changing the drive frequency of the second drive signal within a predetermined range, specifies the drive frequency at which the impedance is a local maximum, sets the drive frequency as the first drive frequency, and inputs the first drive signal of the first drive frequency to the first ultrasonic element 30.

The fluidic device 10 generates the standing wave SW in the fluid S in the channel 20 by the first ultrasonic element 30. When the temperature of the fluid S changes, the sound velocity in the fluid S changes, and thus the formation condition of the standing wave SW changes. Therefore, in the present embodiment, as described above, the impedance of the second ultrasonic element 40 is measured while changing the drive frequency of the second ultrasonic element 40. In this case, the drive frequency (second drive frequency Fs) at which the impedance is a local maximum can be specified as the first drive frequency Fd for forming the standing wave SW. Therefore, even when the temperature of the fluid changes and the sound velocity changes, the drive frequency of the first drive signal of the first ultrasonic element 30 can be feedback-controlled in accordance with the temperature change. As a result, even when the temperature of the fluid changes, the standing wave SW can be stably generated.

In the present embodiment, the first ultrasonic element 30 is provided at the first position 20A of the channel 20, and transmits an ultrasonic wave along the Y axis in response to an input of the first drive signal. The second ultrasonic element 40 is provided at the second position 20B of the channel 20 and transmits an ultrasonic wave along the Y axis in response to an input of the second drive signal. In addition, the first position 20A and the second position 20B of the channel 20 have the same channel width L. As described above, the controller 50 measures the impedance of the second ultrasonic element 40 while changing the drive frequency of the second drive signal input to the second ultrasonic element 40 within a predetermined range, specifies the drive frequency (second drive frequency Fs) at which the impedance is a local maximum, and sets the drive frequency as the first drive frequency Fd. That is, when the first drive frequency Fd already recorded in the memory 53 does not coincide with the specified second drive frequency Fs, the specified second drive frequency Fs is recorded in the memory 53 as a new first drive frequency Fd. Then, the controller 50 inputs the first drive signal of the new first drive frequency Fd to the first ultrasonic element 30.

In the channel 20, since the channel width L is the same at the first position 20A where the first ultrasonic element 30 is provided and at the second position 20B where the second ultrasonic element 40 is provided, the frequency f of the ultrasonic wave for forming the standing wave SW at the first position 20A and the frequency f of the ultrasonic wave for forming the standing wave at the second position 20B are the same, as illustrated in formula (1). Therefore, the first drive frequency Fd for driving the first ultrasonic element 30 can be set based on the impedance of the second ultrasonic element 40 provided at the second position 20B.

As described, since the second ultrasonic element 40 that measures the impedance is separated from the first ultrasonic element 30 that forms the standing wave SW, the impedance of the second ultrasonic element 40 can be measured in a state where the formation of the standing wave SW at the first position 20A is continued, and feedback control of the first ultrasonic element 30 based on the measurement result can be performed.

In the present embodiment, the controller 50 includes the continuous wave generation circuit 51 serving as a first drive unit and the impedance measurement circuit 52 serving as a second drive unit. The continuous wave generation circuit

51 is a circuit that outputs the first drive signal to the first ultrasonic element 30 and that is configured to change the drive frequency of the first drive signal. The impedance measurement circuit 52 is a circuit that outputs the second drive signal to the second ultrasonic element 40 and that is configured to change the drive frequency of the second drive signal within a predetermined range, and measures the impedance of the second ultrasonic element 40 at the time when the drive frequency of the second drive signal is changed within the predetermined range.

In the present embodiment, the impedance of the second ultrasonic element 40 can be measured by the impedance measurement circuit 52 while the first ultrasonic element 30 is driven by the continuous wave generation circuit 51. That is, in the present embodiment, it is possible to perform feedback control based on the impedance of the second ultrasonic element 40 provided at the second position 20B while continuing the formation of the standing wave SW at the first position 20A.

In addition, in the present embodiment, when water is used as the fluid S, it is possible to provide the fluidic device 10 capable of appropriately separating the fine particles M contained in the water, and it is possible to widen the range of use. For example, when domestic wastewater discharged from a washing machine or a kitchen is caused to flow into the fluidic device 10, fine particles contained in the domestic wastewater can be separated. In this case, it is possible to separate fine plastic fibers contained in washing water, polishing powder of a detergent contained in the wastewater of the kitchen, and the like, and it is also possible to prevent environmental damage caused by substances such as plastic waste. However, the fluid S is not limited to water. For example, when blood is used as the fluid S, it is possible to provide the fluidic device 10 capable of separating a cell component contained in the blood. When the cell component is cancer cells in blood, the cancer cells contained in the blood can be separated and removed, and metastasis of cancer can be prevented.

Second Embodiment

Next, a fluidic device according to a second embodiment will be described.

In the first embodiment described above, an example is described in which the ultrasonic transmission part according to the present disclosure includes the first ultrasonic element 30 and the second ultrasonic element 40, the first ultrasonic element 30 generates the standing wave SW in the channel 20, and the optimum drive frequency is specified using the impedance of the second ultrasonic element 40. In contrast, the second embodiment is different from the first embodiment in that the ultrasonic transmission part is implemented by one ultrasonic element.

Figure 5:
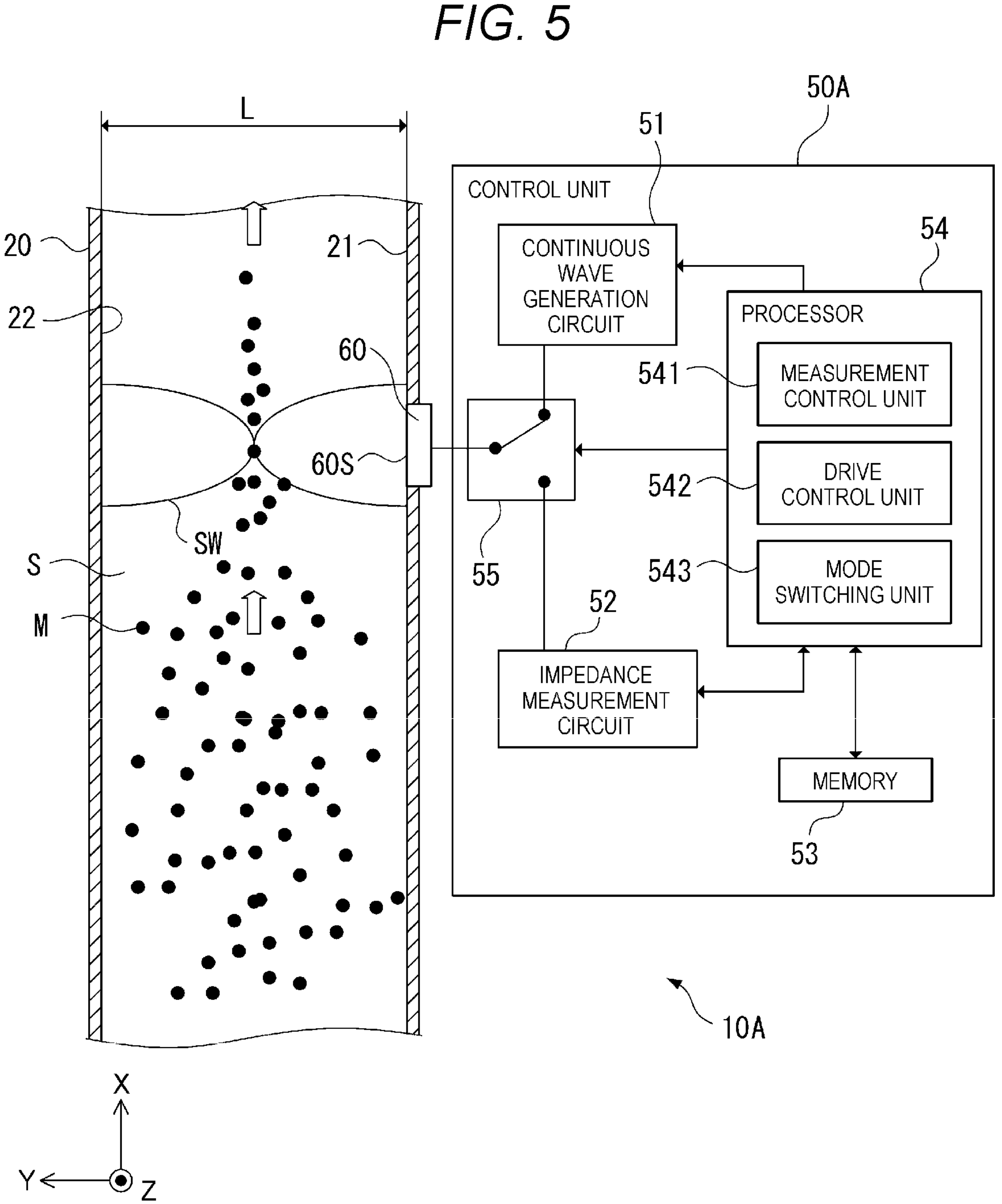
FIG. 5 is a diagram schematically illustrating a fluidic device according to a second embodiment.

FIG. 5 is a diagram schematically illustrating a fluidic device 10A according to the second embodiment. In the following description, configurations already described are denoted by the same reference signs, and a description thereof will be omitted or simplified.

Similar to the first embodiment, the fluidic device 10A includes the channel 20, and a third ultrasonic element 60 having the same configuration as the first ultrasonic element 30 is provided at a predetermined position of the channel 20. That is, the third ultrasonic element 60 is provided in the first wall surface 21 of the channel 20 such that an ultrasonic transmission surface 60S constitutes a part of the first wall surface 21, and transmits an ultrasonic wave toward the second wall surface 22 along the Y axis.

A controller 50A further includes a switch part 55 in addition to the continuous wave generation circuit 51, the impedance measurement circuit 52, the memory 53, and the processor 54.

The switch part 55 is coupled to the continuous wave generation circuit 51, the impedance measurement circuit 52, and the third ultrasonic element 60. The switch part 55 can switch between a drive mode coupling for coupling the continuous wave generation circuit 51 and the third ultrasonic element 60 and a measurement mode coupling for coupling the impedance measurement circuit 52 and the third ultrasonic element 60, and switches between these couplings under the control of the processor 54.

The processor 54 functions as the measurement controller 541, the drive controller 542, and a mode switching unit 543 by executing a program stored in the memory 53.

In the present embodiment, the mode switching unit 543 switches a coupling state of the switch part 55 between the measurement mode coupling and the drive mode coupling.

When the mode switching unit 543 switches the switch part 55 to the measurement mode coupling, the measurement controller 541 outputs a measurement command to the impedance measurement circuit 52. Accordingly, the impedance measurement circuit 52 sweeps drive frequencies of a drive signal to be input to the third ultrasonic element 60 within a predetermined range, and measures impedance of the third ultrasonic element 60.

When the mode switching unit 543 switches the switch part 55 to the drive mode coupling, the drive controller 542 outputs, to the continuous wave generation circuit 51, a drive command for outputting a drive signal of the first drive frequency Fd to the third ultrasonic element 60. Accordingly, an ultrasonic wave having an optimum drive frequency for forming the standing wave SW is output from the third ultrasonic element 60.

Method for Controlling Fluidic Device

Figure 6:
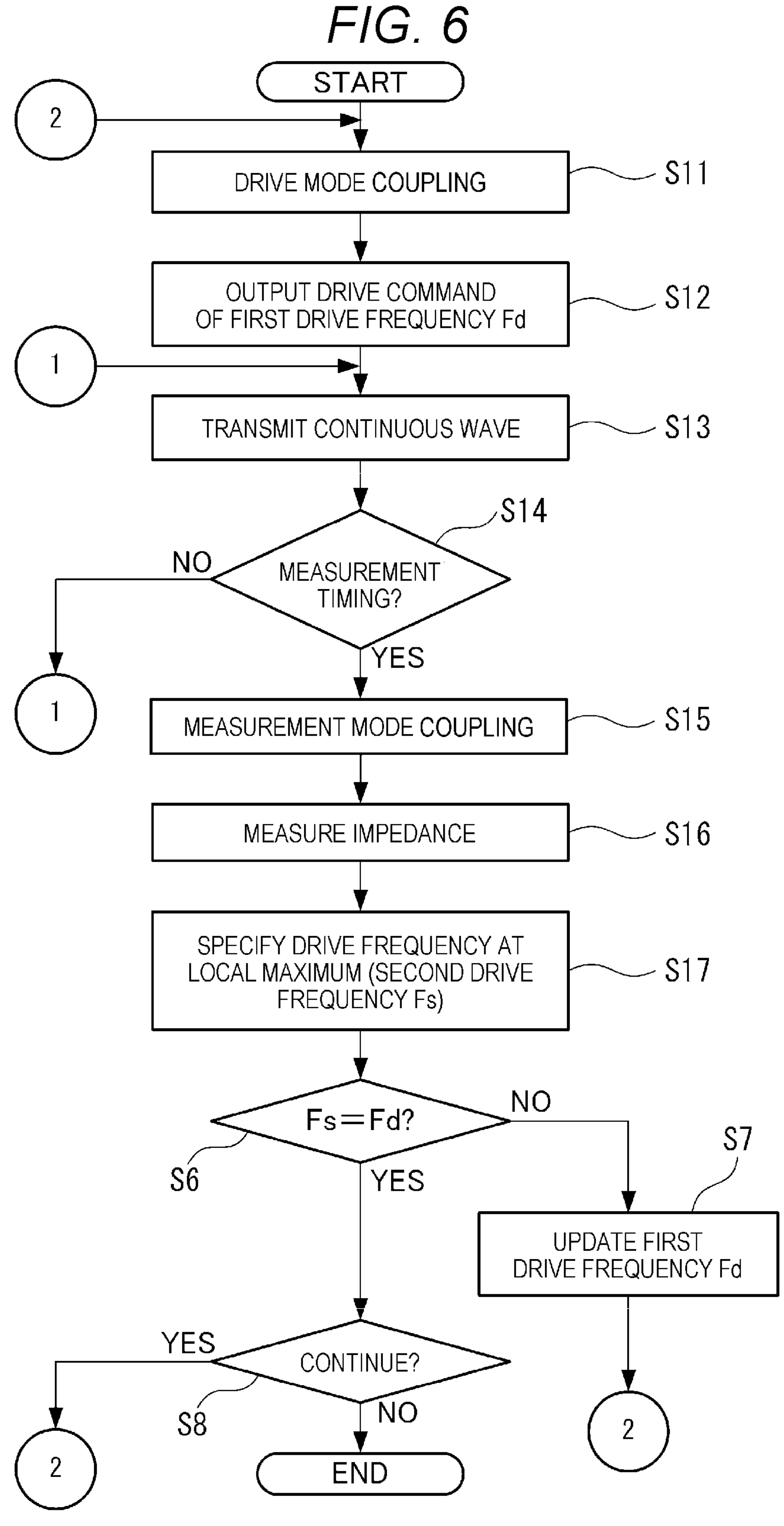
FIG. 6 is a flowchart illustrating a method for controlling the fluidic device according to the second embodiment.

Next, a method for controlling the fluidic device 10A according to the second embodiment will be described. FIG. 6 is a flowchart illustrating the method for controlling the fluidic device 10A according to the second embodiment.

In the present embodiment, the frequency of the ultrasonic wave output from the third ultrasonic element 60 is feedback-controlled based on an impedance measurement result obtained in the measurement mode. The measurement of the impedance of the third ultrasonic element 60 may be performed at a constant cycle, and may be performed, for example, when the fluidic device 10A is started.

In the example illustrated in FIG. 6, an example in which the impedance of the third ultrasonic element 60 is measured at a constant cycle is illustrated.

In the present embodiment, first, the mode switching unit 543 switches an operation mode to a drive mode. That is, the mode switching unit 543 switches the switch part 55 to the drive mode coupling, and couples the third ultrasonic element 60 and the continuous wave generation circuit 51 (step S11).

Thereafter, similarly to step S1 of the first embodiment, the drive controller 542 reads the first drive frequency Fd recorded in the memory 53, and outputs, to the continuous wave generation circuit 51, a drive command for driving the third ultrasonic element 60 with a drive signal of the first drive frequency Fd (step S12).

Accordingly, similarly to step S2, the continuous wave generation circuit 51 continues to output the first drive signal of the first drive frequency Fd to the third ultrasonic element 60, and a continuous wave based on the first drive frequency Fd is transmitted from the third ultrasonic element 60 to the fluid S (step S13).

Thereafter, the mode switching unit 543 determines whether a predetermined measurement timing set in advance is reached (step S14), and when the measurement timing is reached (step S14: YES), the mode switching unit 543 switches the operation mode to a measurement mode. That is, the mode switching unit 543 switches the switch part 55 to the measurement mode coupling, and couples the third ultrasonic element 60 and the impedance measurement circuit 52 (step S15).

Then, similarly to step S4, the measurement controller 541 outputs an impedance measurement command to the impedance measurement circuit 52, and measures a change in impedance of the third ultrasonic element 60 (step S16).

In addition, similarly to step S5, the measurement controller 541 specifies a drive frequency (second drive frequency Fs) of a drive signal output to the third ultrasonic element 60 at a timing when the impedance of the third ultrasonic element 60 is a local maximum, based on an impedance measurement result output from the impedance measurement circuit 52 (step S17).

Thereafter, processing similar to that of steps S6 to S8 of the first embodiment is performed. That is, it is determined in step S6 whether the current first drive frequency Fd coincides with the second drive frequency Fs specified in step S17. When it is determined to be NO in step S6, the first drive frequency Fd recorded in the memory 53 is updated in step S7, and then the processing is returned to step S11. Accordingly, after the operation mode is switched to the drive mode in step S11, a drive command for driving the third ultrasonic element 60 at the first drive frequency Fd updated in step S12 is output to the continuous wave generation circuit 51, and the standing wave SW is formed in the fluid S by the third ultrasonic element 60 in step S13.

When it is determined to be YES in step S6, it is determined by the processing of step S8 whether the formation of the standing wave SW is continued, and when the formation of the standing wave SW is continued (step S8: YES), the processing is returned to step S11. That is, the operation mode is switched to the drive mode without updating the first drive frequency Fd. Similarly to the first embodiment, the processing of step S8 may be performed at any timing.

In addition, in the example illustrated in FIG. 6, after the drive mode is implemented in steps S11 to S13, the processing of steps S14 to S17 and steps S6 and S7 is performed, but the present disclosure is not limited thereto. For example, before step S11, step S14 may be performed to switch to the measurement mode, and the impedance measurement processing of steps S13 to S17 and the first drive frequency update processing of steps S6 and S7 may be performed, and thereafter the processing of switching to the drive mode may be performed in step S11.

Operation and Effect of Present Embodiment

In the fluidic device 10A of the present embodiment, the ultrasonic transmission part is implemented by a single third ultrasonic element 60. The controller 50A performs the measurement mode in which the drive frequency of the drive signal is changed within a predetermined range and the drive signal of a corresponding drive frequency is input to the third ultrasonic element 60, and the drive mode in which the drive frequency of the drive signal is fixed and the drive signal of the fixed drive frequency is input to the third ultrasonic element 60. In the measurement mode, the impedance of the third ultrasonic element 60 is measured, and a drive frequency, at which the impedance is a local maximum, is specified and set as the first drive frequency. In the drive mode, a drive signal of the first drive frequency Fd set in the measurement mode is input to the third ultrasonic element 60.

In this case, the formation of the standing wave SW and the measurement of the impedance for setting an optimum drive frequency (the first drive frequency Fd) can be performed by the single third ultrasonic element 60, and the configuration of the ultrasonic device can be simplified.

In the present embodiment, the controller 50A includes the continuous wave generation circuit 51, the impedance measurement circuit 52, and the switch part 55.

Accordingly, when the switch part 55 is switched to the drive mode coupling, the standing wave SW can be formed in the channel 20 by the third ultrasonic element 60; when the switch part 55 is switched to the measurement mode coupling, the impedance of the third ultrasonic element 60 can be measured, and the first drive frequency Fd suitable for forming the standing wave SW can be specified.

Modification

The present disclosure is not limited to the embodiments described above, and configurations obtained through modifications, alterations, and appropriate combinations of the embodiments within a scope of making it possible to achieve the object of the present disclosure are included in the present disclosure.

First Modification

In the first embodiment, the second drive frequency Fs based on the impedance measured by the second ultrasonic element 40 is stored in the memory 53 as the first drive frequency Fd, and the drive controller 542 reads the first drive frequency Fd to drive the first ultrasonic element 30. But the present disclosure is not limited thereto. At a time-point when the second drive frequency Fs is obtained, a drive command in which the second drive frequency Fs is set as the first drive frequency Fd may be output from the drive controller 542 to the continuous wave generation circuit 51.

Second Modification

The first embodiment shows the configuration in which, the first ultrasonic element 30 and the second ultrasonic element 40 are provided in the first wall surface 21, and the second embodiment shows the configuration in which, the third ultrasonic element 60 is provided in the first wall surface 21, but the present disclosure is not limited thereto.

For example, the first ultrasonic element 30, the second ultrasonic element 40, and the third ultrasonic element 60 may be provided in the second wall surface 22.

When ultrasonic waves are transmitted from the first ultrasonic element 30, the second ultrasonic element 40, and the third ultrasonic element 60, the ultrasonic waves spread and propagate around the ultrasonic transmission surfaces 30S, 40S, and 60S. Therefore, the first ultrasonic element 30, the second ultrasonic element 40, and the third ultrasonic element 60 may be provided in a side surface orthogonal to the first wall surface 21 and the second wall surface 22, for example, a bottom surface of a recessed groove of a base substrate or a lid substrate. In this case, the first ultrasonic element 30, the second ultrasonic element 40, and the third ultrasonic element 60 may be provided so as to be positioned at the antinode of the standing wave SW.

Third Modification

Although each of the first ultrasonic element 30 and the second ultrasonic element 40 forms a channel wall surface of the channel 20 in the first embodiment, the present disclosure is not limited thereto. For example, a wall member of the channel 20 may be disposed between the first ultrasonic element 30 and the fluid S, or a wall member of the channel 20 may be disposed between the second ultrasonic element 40 and the fluid S. The same applies to the third ultrasonic element 60 of the second embodiment.

Overview of Present Disclosure

A fluidic device according to a first aspect of the present disclosure includes: a channel that extends along a first axis and through which a fluid flows; an ultrasonic transmission part that is disposed at the channel and transmits an ultrasonic wave into the channel along a second axis orthogonal to the first axis in response to an input of a drive signal; and a controller that controls the ultrasonic transmission part. The controller measures impedance of the ultrasonic transmission part at a time when the ultrasonic transmission part is driven while changing a drive frequency of the drive signal within a predetermined range, specifies a drive frequency at which the impedance is a local maximum and sets the drive frequency as a first drive frequency, and inputs the drive signal of the first drive frequency to the ultrasonic transmission part.

When a standing wave is formed by the ultrasonic transmission part, the ultrasonic transmission part is located at an antinode of the standing wave. At the antinode of the standing wave, a sound pressure is maximized, and thus resistance (impedance) at the time of driving the ultrasonic transmission part is also maximized. Therefore, as described above, the impedance of the ultrasonic transmission part is measured while changing the drive frequency of the ultrasonic transmission part, so that it is possible to determine whether a standing wave is formed. That is, when the ultrasonic transmission part is driven at a drive frequency at which the impedance is a local maximum, it can be determined that the standing wave is formed in the channel and the sound pressure is maximized at the ultrasonic transmission part. Therefore, even when a temperature of the fluid changes and a sound velocity changes, the first drive frequency of the drive signal for forming the standing wave can be specified, and the frequency of the ultrasonic wave transmitted from the ultrasonic transmission part can be feedback-controlled in accordance with the temperature change. As a result, even when the temperature of the fluid changes, the standing wave can be stably generated.

In the fluidic device according to the first aspect, the ultrasonic transmission part includes a first ultrasonic element that is provided at a first position of the channel and that transmits an ultrasonic wave along the second axis in response to an input of a first drive signal; and a second ultrasonic element that is provided at a second position different in position from the first position in the channel in a direction along the first axis and that transmits an ultrasonic wave along the second axis in response to an input of a second drive signal. In the channel, a width along the second axis at the first position and a width along the second axis at the second position are the same. The controller measures the impedance of the second ultrasonic element at a time of driving the second ultrasonic element while changing a drive frequency of the second drive signal input to the second ultrasonic element within the predetermined range, sets a drive frequency at which the impedance of the second ultrasonic element is a local maximum as the first drive frequency, sets a drive frequency of the first drive signal to the first drive frequency, and inputs the first drive signal of the first drive frequency to the first ultrasonic element.

In this aspect, the channel width along the second axis is the same at the first position where the first ultrasonic element is provided and at the second position where the second ultrasonic element is provided, and a formation condition of the standing wave is the same at the first position and the second position. Therefore, by measuring a change in the impedance of the second ultrasonic element at the time when the drive frequency of the second drive signal input to the second ultrasonic element is changed, the formation condition of the standing wave at the first position can be specified. That is, the drive frequency at which the impedance of the second ultrasonic element is a local maximum is specified and set as the first drive frequency, and the first drive signal of the first drive frequency is applied to the first ultrasonic element, so that it is possible to appropriately form the standing wave at the first position. As described, since the second ultrasonic element whose impedance is to be measured is separated from the first ultrasonic element that forms the standing wave, it is possible to measure the impedance of the second ultrasonic element while continuing the formation of the standing wave at the first position, and to perform feedback control of the first ultrasonic element based on the measurement result.

In the fluidic device according to the first aspect, the controller includes: a first drive unit that outputs the first drive signal, is configured to change a drive frequency of the first drive signal, and is coupled to the first ultrasonic element; and a second drive unit that outputs the second drive signal, is configured to change a drive frequency of the second drive signal, is coupled to the second ultrasonic element, and measures the impedance of the second ultrasonic element at a time when the drive frequency of the second drive signal is changed within the predetermined range.

As described above, when the first ultrasonic element and the second ultrasonic element are provided in the channel, the controller is provided with the first drive unit for driving the first ultrasonic element and the second drive unit for driving the second ultrasonic element and measuring the impedance of the second ultrasonic element. As described, since the first drive unit for driving the first ultrasonic element and the second drive unit for driving the second ultrasonic element are separately provided, it is possible to measure the impedance of the second ultrasonic element while continuing the formation of the standing wave by the first ultrasonic element at the first position.

In the fluidic device according to the first aspect, the ultrasonic transmission part may be a single ultrasonic element, and the controller may perform a measurement mode in which a drive frequency of the drive signal is changed within the predetermined range and the drive signal of a corresponding drive frequency is input to the ultrasonic element, and a drive mode in which a drive frequency of the drive signal is fixed and the drive signal of the fixed drive frequency is input to the ultrasonic element. In the measurement mode, the impedance of the ultrasonic element may be measured, a drive frequency at which the impedance is a local maximum may be specified and set as the first drive frequency. In the drive mode, a drive frequency of the drive signal may be fixed to the first drive frequency and the drive signal of the first drive frequency may be input to the ultrasonic element.

In this case, the formation of the standing wave and the measurement of the impedance for setting an optimum drive frequency can be performed by one ultrasonic element, and a configuration of an ultrasonic device can be simplified.

In the fluidic device according to the first aspect, the controller includes: a first drive unit that outputs the drive signal and is configured to change a drive frequency of the drive signal; a second drive unit that outputs the drive signal, is configured to change a drive frequency of the drive signal, and measures the impedance of the ultrasonic transmission part at a time when the drive frequency of the drive signal is changed within the predetermined range; and a switch part that is coupled to the first drive unit, the second drive unit, and the ultrasonic transmission part, and is configured to switch between a drive mode coupling for coupling the first drive unit and the ultrasonic transmission part, and a measurement mode coupling for coupling the second drive unit and the ultrasonic transmission part.

As described above, when the ultrasonic transmission part is implemented by one ultrasonic element, the first drive unit for forming the standing wave, the second drive unit for measuring the impedance, and the switch part are provided in the controller. Accordingly, when the switch part is switched to the drive mode coupling, the standing wave can be formed in the channel by the ultrasonic element; when the switch part is switched to the measurement mode coupling, the impedance of the ultrasonic element can be measured, and the first drive frequency suitable for forming the standing wave can be specified.

A method for controlling a fluidic device according to a second aspect of the present disclosure is a method for controlling a fluidic device that captures a fine particle in a fluid flowing through a channel extending along a first axis, the fluidic device including an ultrasonic transmission part that is disposed at the channel and transmits an ultrasonic wave into the channel along a second axis orthogonal to the first axis in response to input of a drive signal. The method for controlling a fluidic device includes: measuring impedance of the ultrasonic transmission part at a time when the ultrasonic transmission part is driven while changing a drive frequency of the drive signal within a predetermined range; specifying a drive frequency at which the impedance is a local maximum and setting the drive frequency as a first drive frequency; and inputting the drive signal of the first drive frequency to the ultrasonic transmission part.

Accordingly, similarly to the first aspect according to the present disclosure, even when a temperature of the fluid changes, a standing wave can be stably generated.

In the method for controlling a fluidic device according to the second aspect, the ultrasonic transmission part includes a first ultrasonic element that is provided at a first position of the channel and transmits an ultrasonic wave along the second axis in response to an input of a first drive signal, and a second ultrasonic element that is provided at a second position different in position from the first position in the channel in a direction along the first axis and that transmits an ultrasonic wave along the second axis in response to an input of a second drive signal, and in the channel, a width along the second axis at the first position and a width along the second axis at the second position are the same. The method for controlling a fluidic device includes: measuring the impedance of the second ultrasonic element at a time when the second ultrasonic element is driven while changing a drive frequency of the second drive signal input to the second ultrasonic element within the predetermined range; setting a drive frequency at which the impedance is a local maximum as the first drive frequency; and setting a drive frequency of the first drive signal to the first drive frequency and inputting the first drive signal of the first drive frequency to the first ultrasonic element.

Accordingly, since the second ultrasonic element whose impedance is to be measured is separated from the first ultrasonic element that forms a standing wave, it is possible to measure the impedance of the second ultrasonic element while continuing the formation of the standing wave at the first position, and to perform feedback control of the first ultrasonic element based on the measurement result.

In the method for controlling a fluidic device according to the second aspect, the ultrasonic transmission part is a single ultrasonic element, and the method for controlling a fluidic device includes: performing a measurement mode in which a drive frequency of the drive signal is changed within the predetermined range and the drive signal of a corresponding drive frequency is input to the ultrasonic element, and a drive mode in which a drive frequency of the drive signal is fixed and the drive signal of the fixed drive frequency is input to the ultrasonic element. In the measurement mode, the impedance of the ultrasonic element may be measured, and a drive frequency at which the impedance is a local maximum may be specified and set as the first drive frequency. In the drive mode, a drive frequency of the drive signal may be fixed to the first drive frequency and the drive signal of the first drive frequency may be input to the ultrasonic element.

Accordingly, the formation of the standing wave and the measurement of the impedance for setting an optimum drive frequency can be performed by one ultrasonic element, and a configuration of an ultrasonic device can be simplified.

What is claimed is:

1. A fluidic device comprising:

a channel that extends along a first axis and through which a fluid flows;

an ultrasonic transmission part that is disposed at the channel and transmits an ultrasonic wave into the channel along a second axis orthogonal to the first axis in response to an input of a drive signal;

a first circuit;

a second circuit; and a processor that:

controls the ultrasonic transmission part via at least one of the first circuit or the second circuit;

controls the second circuit to change a drive frequency of the drive signal within a predetermined range;

controls the second circuit to drive the ultrasonic transmission part by changing the drive frequency of the drive signal within the predetermined range;

controls the second circuit to measure impedance of the ultrasonic transmission part at a time when the ultrasonic transmission part is driven while changing the drive frequency of the drive signal within the predetermined range;

specifies a drive frequency at which the impedance is a local maximum;

sets the drive frequency at which the impedance is the local maximum as a first drive frequency; and controls the first circuit to input the drive signal of the first drive frequency to the ultrasonic transmission part.

2. The fluidic device according to claim 1, wherein the ultrasonic transmission part includes a first ultrasonic element that is provided at a first position of the channel and transmits the ultrasonic wave along the second axis in response to an input of a first drive signal, and a second ultrasonic element that is provided at a second position different in position from the first position in the channel in a direction along the first axis, and transmits the ultrasonic wave along the second axis in response to an input of a second drive signal, a width of the channel along the second axis at the first position and a width of the channel along the second axis at the second position are the same, and the processor:

controls the second circuit to change a drive frequency of the second drive signal within the predetermined range;

controls the second circuit to drive the second ultrasonic element by changing the drive frequency of the second drive signal within the predetermined range;

controls the second circuit to measure impedance of the second ultrasonic element at a time of driving the second ultrasonic element while changing the drive frequency of the second drive signal input to the second ultrasonic element within the predetermined range;

sets a drive frequency at which the impedance of the second ultrasonic element is the local maximum as the first drive frequency;

sets a drive frequency of the first drive signal to the first drive frequency; and controls the first circuit to input the first drive signal of the first drive frequency to the first ultrasonic element.

3. The fluidic device according to claim 2, wherein the first circuit:

outputs the first drive signal; and changes the drive frequency of the first drive signal, the first circuit is coupled to the first ultrasonic element, and the second circuit:

outputs the second drive signal;

the drive frequency of the second drive signal, wherein the second circuit is coupled to the second ultrasonic element; and measures the impedance of the second ultrasonic element at a time when the drive frequency of the second drive signal is changed within the predetermined range.

4. The fluidic device according to claim 1, wherein the ultrasonic transmission part is a single ultrasonic element, the processor operates in a measurement mode and a drive mode, and the processor:

controls, in the measurement mode, the second circuit to change the drive frequency of the drive signal within the predetermined range;

controls, in the measurement mode, the second circuit to input the drive signal of a corresponding drive frequency to the single ultrasonic element;

fixes, in the drive mode, the drive frequency of the drive signal;

controls, in the drive mode, the first circuit to input the drive signal of the fixed drive frequency to the single ultrasonic element;

controls, in the measurement mode, the second circuit to measure impedance of the single ultrasonic element;

specifies, in the measurement mode, the drive frequency at which the impedance is the local maximum;

sets, in the measurement mode, the specified drive frequency as the first drive frequency;

fixes, in the drive mode, the drive frequency of the drive signal to the first drive frequency; and controls, in the drive mode, the first circuit to input the drive signal of the first drive frequency to the single ultrasonic element.

5. The fluidic device according to claim 4, further comprising:

a switch part coupled to the first circuit, the second circuit, and the ultrasonic transmission part, wherein the first circuit outputs the drive signal and is configured to change the drive frequency of the drive signal, the second circuit:

outputs the drive signal;

changes the drive frequency of the drive signal; and measure the impedance of the ultrasonic transmission part at a time when the drive frequency of the drive signal is changed within the predetermined range, the switch part switches between a first coupling state and a second coupling state, the switch part couples, in the first coupling state, the first circuit and the ultrasonic transmission part, and the switch part couples, in the second coupling state, the second circuit and the ultrasonic transmission part.

6. A method for controlling a fluidic device that captures a fine particle in a fluid flowing through a channel extending along a first axis, the fluidic device including an ultrasonic transmission part that is disposed at the channel and transmits an ultrasonic wave into the channel along a second axis orthogonal to the first axis in response to input of a drive signal, the fluidic device further including a first circuit, a second circuit, and a processor for controlling execution of the method, and the method for controlling the fluidic device comprising:

controlling the ultrasonic transmission part via at least one of the first circuit or the second circuit;

controlling the second circuit to change a drive frequency of the drive signal within a predetermined range;

controlling the second circuit to drive the ultrasonic transmission part by changing the drive frequency of the drive signal within the predetermined range;

controlling the second circuit to measure impedance of the ultrasonic transmission part at a time when the ultrasonic transmission part is driven while changing the drive frequency of the drive signal within the predetermined range;

specifying a drive frequency at which the impedance is a local maximum;

setting the drive frequency at which the impedance is the local maximum as a first drive frequency; and controlling the first circuit to input the drive signal of the first drive frequency to the ultrasonic transmission part.

7. The method for controlling the fluidic device according to claim 6, the ultrasonic transmission part including a first ultrasonic element that is provided at a first position of the channel and transmits the ultrasonic wave along the second axis in response to an input of a first drive signal, and a second ultrasonic element that is provided at a second position different in position from the first position in the channel in a direction along the first axis, and transmits the ultrasonic wave along the second axis in response to an input of a second drive signal, and in the channel, a width along the second axis at the first position and a width along the second axis at the second position are the same, the method further comprising:

controlling the second circuit to change a drive frequency of the second drive signal within the predetermined range;

controlling the second circuit to drive the second ultrasonic element by changing the drive frequency of the second drive signal within the predetermined range;

controlling the second circuit to measure impedance of the second ultrasonic element at a time when the second ultrasonic element is driven while changing the drive frequency of the second drive signal input to the second ultrasonic element within the predetermined range;

setting a drive frequency at which the impedance of the second ultrasonic element is the local maximum as the first drive frequency;

setting a drive frequency of the first drive signal to the first drive frequency; and controlling the first circuit to input the first drive signal of the first drive frequency to the first ultrasonic element.

8. The method for controlling the fluidic device according to claim 6, the ultrasonic transmission part being a single ultrasonic element, the processor operating in a measurement mode and a drive mode, and the method comprising:

controlling, in the measurement mode, the second circuit to change the drive frequency of the drive signal within the predetermined range;

controlling, in the measurement mode, the second circuit to input the drive signal of a corresponding drive frequency to the single ultrasonic element;

fixing, in the drive mode, the drive frequency of the drive signal;

controlling, in the drive mode, the first circuit to input the drive signal of the fixed drive frequency to the single ultrasonic element;

controlling, in the measurement mode, the second circuit to measure impedance of the single ultrasonic element;

specifying, in the measurement mode, the drive frequency at which the impedance is the local maximum;

setting, in the measurement mode, the specified drive frequency as the first drive frequency;

fixing, in the drive mode, the drive frequency of the drive signal to the first drive frequency; and controlling, in the drive mode, the first circuit to input the drive signal of the first drive frequency to the single ultrasonic element.

* * * * *